United States Patent
Mori et al.

(10) Patent No.: US 7,041,982 B2
(45) Date of Patent: May 9, 2006

(54) X-RAY IMAGE DETECTION APPARATUS

(75) Inventors: Harumichi Mori, Hamamatsu (JP);
Ryuji Kyushima, Hamamatsu (JP);
Kazuki Fujita, Hamamatsu (JP);
Masahiko Honda, Hamamatsu (JP)

(73) Assignee: Hamamatsu Photonics K.K., Shizuoka (JP)

( * ) Notice: Subject to any disclaimer, the term of this patent is extended or adjusted under 35 U.S.C. 154(b) by 136 days.

(21) Appl. No.: 10/183,160

(22) Filed: Jun. 28, 2002

(65) Prior Publication Data
US 2002/0158208 A1    Oct. 31, 2002

Related U.S. Application Data

(63) Continuation-in-part of application No. PCT/JP01/00084, filed on Jan. 11, 2001.

(30) Foreign Application Priority Data

Jan. 11, 2000    (JP)    ............ P2000-002900

(51) Int. Cl.
*G01T 1/24* (2006.01)
(52) U.S. Cl. ............ 250/370.11; 250/370.01; 250/336.1
(58) Field of Classification Search ............ 250/370.11
See application file for complete search history.

(56) References Cited

U.S. PATENT DOCUMENTS

| | | | | |
|---|---|---|---|---|
| 4,593,400 A | | 6/1986 | Mouyen | 378/99 |
| 5,262,649 A | * | 11/1993 | Antonuk et al. | 250/370.09 |
| 5,464,984 A | * | 11/1995 | Cox et al. | 250/370.11 |
| 5,733,476 A | * | 3/1998 | Takiguchi et al. | 252/299.62 |
| 5,965,872 A | | 10/1999 | Endo et al. | 250/208.1 |
| 6,031,892 A | * | 2/2000 | Karellas | 378/98.3 |
| 6,350,990 B1 | * | 2/2002 | Wei et al. | 250/370.11 |
| 6,414,315 B1 | * | 7/2002 | Wei et al. | 250/370.11 |
| 2002/0011572 A1 | * | 1/2002 | Kajiwara et al. | 250/370.11 |

FOREIGN PATENT DOCUMENTS

| JP | 60-234645 | | 11/1985 |
|---|---|---|---|
| JP | 363215987 A | * | 9/1988 |
| JP | 5-242841 | | 9/1993 |
| JP | 9-288184 | | 11/1997 |
| JP | 11-160442 | | 6/1999 |
| JP | 2000-28735 | | 1/2000 |

* cited by examiner

*Primary Examiner*—Nikita Wells
*Assistant Examiner*—Phillip A. Johnston
(74) *Attorney, Agent, or Firm*—Drinker Biddle & Reath LLP

(57) ABSTRACT

A solid-state imaging device and a frame are secured onto a base plate. The frame has a positioning portion in contact with a side face of a substrate, so as to protect the bonding wire positioned thereunder while positioning and supporting the substrate abutting thereagainst. The frame is made of a metal, and is further provided with a shield member, so as to restrain X-rays from entering a bonding wire and the like. The substrate is set relatively thin, whereby its X-ray transmissivity improves, though substrate bent occurs in this case. Since an elastic body presses the substrate, the bent of the substrate is corrected.

11 Claims, 3 Drawing Sheets

X-RAY IMAGE DETECTION APPARATUS

RELATED APPLICATION

This is a continuation-in-part application of application serial no. PCT/JP01/00084 filed on Jan. 11, 2001, now pending.

BACKGROUND OF THE INVENTION

1. Field of the Invention

The present invention relates to an X-ray image detection apparatus.

2. Related Background Art

Conventional X-ray image detection apparatus are disclosed in Japanese Patent Application Laid-Open No. SHO 60-234645 and Japanese Patent Application Laid-Open No. HEI 5-242841. In the former a scintillator is evaporated on an X-ray-shielding FOP (fiber optic plate) and bonds thus formed assembly onto a solid-state imaging device, whereas in the latter, a scintillator is evaporated directly on a solid-state imaging device.

SUMMARY OF THE INVENTION

However, there are cases where shadows are formed by bubbles within an adhesive in the former apparatus, whereas there is a possibility of image quality deteriorating in the latter since the solid-state imaging device is placed in an environment for forming the scintillator. In order to overcome such problems, it is an object of the present invention to provide an X-ray image detection apparatus which can yield favorable X-ray images.

For overcoming the above-mentioned problems, this X-ray image detection apparatus comprises a scintillator substrate having a scintillator evaporated on an X-ray-transparent substrate; a solid-state imaging device having an imaging plane on which the scintillator is disposed; amount substrate, formed with a lead for inputting an output signal from the solid-state imaging device, for securing the solid-state imaging device; a frame, secured onto the mount substrate so as to surround the solid-state imaging device, having a positioning portion projecting toward the scintillator substrate such that at least a part thereof abuts against the scintillator substrate; and a bonding wire, positioned within a space between the positioning portion and the mount substrate, for connecting the solid-state imaging device and the lead to each other.

An X-ray image transmitted through the X-ray-transparent substrate is converted by the scintillator formed thereon into a visible image. This visible image is made directly incident on the imaging plane of the solid-state imaging device, whereas video signals of the visible image outputted from the solid-state imaging device are outputted to the lead formed on the mount substrate by way of the bonding wire protected by the positioning portion. Therefore, X-ray images with a favorable quality can be obtained in this apparatus.

In particular, the positioning portion of the frame protects the bonding wire positioned thereunder while positioning and supporting the scintillator substrate abutting thereagainst, whereby it is not necessary for the solid-state imaging device to be bonded with an adhesive which may incorporate bubbles therein. When the frame is made of a metal, it improves a shield effect for restraining X-rays from entering the readout section of the solid-state imaging device, bonding wires, bonding pads, and the like. When the shield factor is insufficient, it is desirable that the positioning portion of the frame be further provided with a shield member made of an X-ray-shielding material on a side opposite from the bonding wire, so as to block the X-rays.

Though at least a part of the positioning portion abuts against the scintillator substrate, the scintillator substrate will be positioned if two sides of the periphery of the scintillator substrate are pressed against two inner sides of the positioning portion in cases where the inside of the positioning portion is rectangular (e.g., square) while the periphery of the scintillator substrate is rectangular (e.g., square), whereby it is not necessary for both of them to be in contact with each other at all of the four sides.

Though there are cases where the scintillator substrate is not secured in particular when the mount substrate is used with its surface being oriented horizontal, it is preferably secured. Namely, it is preferred that the apparatus further comprise a press plate secured to the frame so as to close an opening of the frame, and an elastic body interposed between the press plate and the scintillator substrate, the elastic body pressing the scintillator substrate toward the solid-state imaging device.

In this case, the scintillator substrate is pressed toward the solid-state imaging device while being secured by the press plate and the elastic body, so as to contact the scintillator substrate with the solid-state imaging device, whereby X-ray images with a better quality can be obtained. When X-rays are soft X-rays in particular, the substrate is set relatively thin in order to improve the X-ray transmissivity of the X-ray-transparent substrate even slightly. When the substrate is thin, however, it may be bent, thereby deteriorating images. Since the contact is enhanced by pressing in the apparatus as mentioned above, the bent of the substrate is corrected, whereby images with a better quality can be obtained.

Even in cases where no elastic body is used, the contact of the scintillator substrate and the solid-state imaging device can be improved when the apparatus comprises a press plated secured to the frame so as to close the opening of the frame whereas the thickness of the scintillator substrate is set such that the X-ray-transparent substrate comes into contact with the press plate, whereby images with a favorable quality can be obtained as in the above.

Whether the contact improving technique mentioned above is used or not, it is desirable that the positioning portion and the scintillator substrate be bonded together. In this case, the bonding further enhances the positioning of the scintillator substrate, and makes it unnecessary to use an adhesive between the scintillator substrate and the imaging plane of the solid-state imaging device, whereby shadows due to bubbles can be prevented.

Such a bonding technique can also be carried out without using a press plate, so that the surface of the X-ray-transparent substrate on the side opposite from the scintillator can be exposed as well. This can improve the X-ray incidence to the scintillator.

Also, it is preferred that the scintillator be coated with a resin film. This improves the moisture resistance of the scintillator. The resin film may be either a single layer or multilayer. When it is a single layer, it can suppress the attenuation factor of visible light images generated in the scintillator. When compared with the multilayer coating, however, its moisture resistance is inferior. When the above-mentioned bonding technique is used, the adhesive applied to the positioning portion also exhibits a moisture-proofing effect in the space where the scintillator is installed, whereby the use of a single layer coating of resin film not only suppresses the attenuation factor of visible light images but also improves the moisture resistance.

Preferably, the X-ray-transparent substrate is made of X-ray-transparent glass or amorphous carbon, the scintillator is made of CsI having a columnar crystal, and the resin film is made of polyparaxylylene.

When carrying out X-ray imaging with a large area, it is preferred that the solid-state imaging device be constituted by a plurality of semiconductor imaging device chips. While the bubbles may be remarkably formed when the imaging plane is coated with an adhesive as conventionally effected in such a case, the apparatus can securely restrain this phenomenon from occurring.

When a plurality of semiconductor imaging device chips 2' are pressed by a mass of elastic body toward the mount substrate 3 such that all the imaging planes of a plurality of semiconductor imaging device chips 2' are positioned within a single plane in particular, the effect mentioned above can be made remarkable, and the distortion of images to be captured can be reduced.

DESCRIPTION OF THE PREFERRED EMBODIMENT

In the following, embodiments of the X-ray image detection apparatus in accordance with the present invention will be explained. Here, constituents identical to each other will be referred to with numerals identical to each other without repeating their overlapping explanations.

First Embodiment

Figure 1:
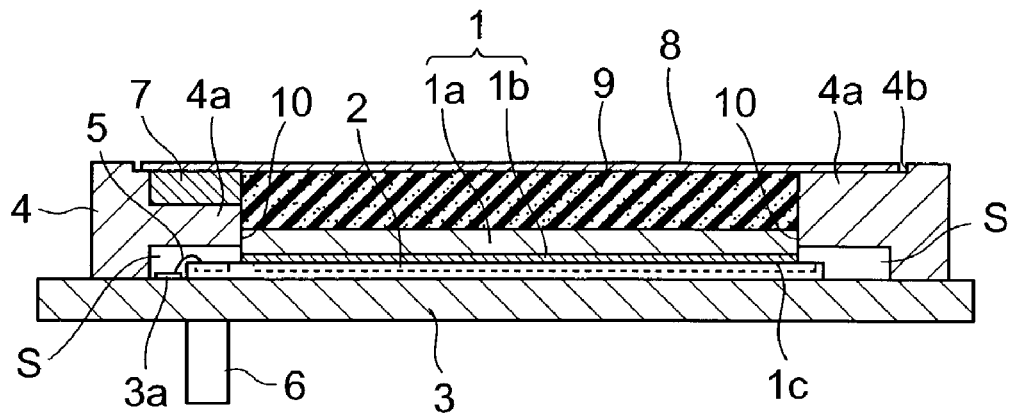
FIG. 1 is a vertical sectional view of the X-ray image detection apparatus in accordance with a first embodiment.

FIG. 1 is a vertical sectional view of the X-ray image detection apparatus in accordance with the first embodiment. This apparatus comprises a scintillator substrate 1 having a scintillator 1b on a surface of an X-ray-transparent substrate 1a. Also, this apparatus comprises a solid-state imaging device 2 having an imaging plane on which the scintillator 1b is disposed. The scintillator 1b is in contact with the imaging plane. When the scintillator 1b is coated with a resin film, the latter comes into contact with the imaging plane. Though the solid-state imaging device 2 may be constituted by a CCD image sensor, it is a MOS type image sensor in this example.

The solid-state imaging device 2 is secured onto the mount substrate 3. The surface of the mount substrate 3 is formed with a lead 3a for inputting output signals from the solid-state imaging device 2.

The apparatus further comprises a frame 4 secured onto the mount substrate 3 so as to surround the solid-state imaging device 2. The frame 4 has a positioning portion 4a projecting toward the scintillator substrate 1 so as to abut against the scintillator substrate 1. The scintillator substrate 1 has a rectangular or square form. The positioning portion 4a surrounds four side faces of the scintillator substrate 1, so as to come into contact therewith.

Though at least a part of the positioning portion 4a abuts against the scintillator substrate 1, the scintillator substrate 1 will be positioned if two sides of the periphery of the scintillator substrate 1 are pressed against two inner sides of the positioning portion 4a in cases where inside periphery of the positioning portion 4a is rectangular (e.g., square) while the periphery of the scintillator substrate 1 is rectangular (e.g., square), whereby it is not necessary for both of them to be in contact with each other at all of four sides.

A space S is formed between the positioning portion 4a and the mount substrate 3. Positioned within the space S are a readout section of the solid-state imaging device 2, a bonding pad portion connecting with the lead 3a on the mount 3, and a bonding wire 5 for connecting the solid-state imaging device 2 and the lead 3a to each other. A connector 6 for inputting driving signals for driving the solid-state imaging device 2 and reading out output signals is attached to the mount substrate 3 on the back side.

In this apparatus, X-rays are incident on the scintillator 1b in a direction through the X-ray-transparent substrate 1a. An X-ray image transmitted through the X-ray-transparent substrate 1a is converted by the scintillator 1b formed thereon into a visible image, which is directly incident on the imaging plane of the solid-state imaging device 2, whereas video signals of the visible image outputted from the solid-state imaging device 2 are fed into the lead 3a formed on the mount substrate 3 by way of the bonding wire 5 protected by the positioning portion 4a. Disposed on the mount substrate 3 are a driving circuit for driving the solid-state imaging device 2, and an amplifier for receiving a video signal outputted from the solid-state imaging device 3 by way of the lead 3a and amplifying thus received video signal. This video signal is outputted as an X-ray image from the connector 6.

In this apparatus, the positioning portion 4a of the frame 4 protects the bonding wire 5 positioned thereunder, while positioning and supporting the scintillator substrate 1 in contact therewith, whereby it is not necessary for the solid-state imaging device 2 to be bonded with an adhesive which may incorporate bubbles therein. When the frame 4 is made of a metal, it improves a shield effect for restraining the X-rays from entering the readout section of the solid-state imaging device 2, the bonding wire 5, bonding pads, and the like. In this example, the positioning portion 4a of the frame 4 is further provided with a shield member 7 made of an X-ray-shielding material on a side opposite from the bonding wire 5, so as to fully block the X-rays. Here, the shield member 7 is made of lead.

The scintillator substrate 1 is secured to the mount substrate 3. Namely, the apparatus comprises a press plate 8 secured to the frame 4 so as to close the opening of the frame 4, and an elastic body 9 interposed between the press plate 8 and the scintillator substrate 1, whereas the elastic body 9 presses the scintillator substrate 1 toward the solid-state imaging device 2. In this example, the elastic body is constituted by a sponge made of urethane or the like.

In this case, the scintillator substrate 1 is pressed toward the solid-state imaging device 2 while being secured to the mount substrate 3 by the press plate 8 and the elastic body 9, whereby the contact of the scintillator substrate 1 to the solid-state imaging device 2 can be enhanced, so as to yield X-ray images with a better quality. In particular, while the substrate 1a is set relatively thin when incident X-rays are soft X-rays in order to improve the X-ray transmissivity of the X-ray-transparent substrate, the substrate 1a may be bent when the substrate 1a is thin, thereby causing images to deteriorate. Since the contact is enhanced by pressing as mentioned above, the apparatus can correct the bent of the substrate, thereby yielding images with a better quality.

The positioning portion 4a and the scintillator substrate 1 are bonded to each other with an adhesive 10. In this case, the bonding further strengthens the positioning of the scintillator substrate 1, and makes it unnecessary to use the adhesive between the scintillator substrate 1 and the imaging plane of the solid-state imaging device 2, whereby shadows due to bubbles can be prevented.

The scintillator 1b is coated with a resin film 1c. This improves the moisture resistance of the scintillator 1b. The resin film 1c may be either a single layer or multilayer. When it is a single layer, it can suppress the attenuation factor of visible light images generated in the scintillator 1b. When compared with the multilayer coating, however, the single layer is inferior in the moisture resistance. When the above-mentioned bonding technique is used, the adhesive 10 applied to the positioning portion 4a also exhibits a moisture-proofing effect in the space where the scintillator is installed, whereby the use of a single layer coating of resin film not only suppresses the attenuation factor of visible light images but also improves the moisture resistance.

In this example, the X-ray-transparent substrate 1a is made of X-ray-transparent glass or amorphous carbon, the scintillator 1b is made of CsI having a columnar crystal, and the resin film is made of polyparaxylylene, so that a visible light image with a high resolution can be obtained while improving the transmissivity of X-rays, and this visible light image can be made incident on the solid-state imaging device 2 with a low attenuation factor.

In this apparatus, the shield member 7 also constitutes a positioning portion, whereas the upper face of the scintillator substrate 1 is set lower than the upper face of the positioning portion 4a of the frame 4. On the other hand, a positioning portion 4b for positioning the press plate is provided at the opening end of the frame 4. While the press plate 8 fits in the step of the positioning portion 4b, the lower face of the press plate 8 abuts against the upper faces of the shield member 7 and the positioning portion 4a on the right side in the drawing, whereas the press plate 8 is secured to the frame 4 with an adhesive interposed therebetween.

Second Embodiment

Figure 2:
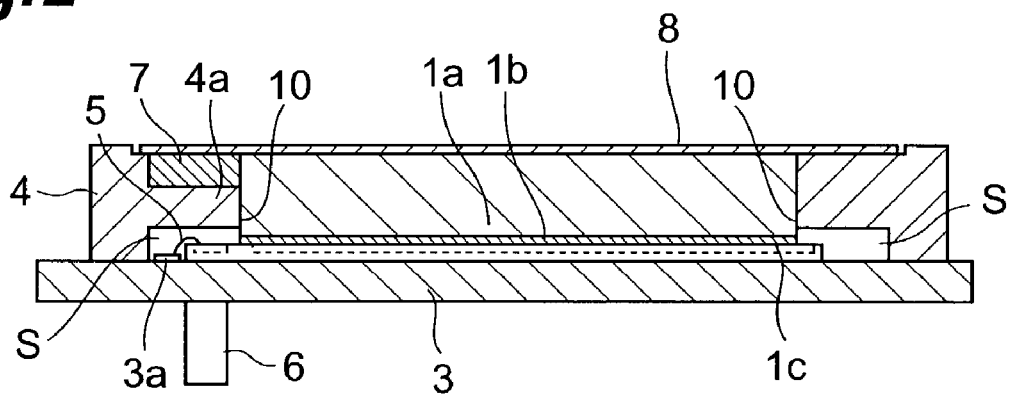
FIG. 2 is a vertical sectional view of the X-ray image detection apparatus in accordance with a second embodiment.

FIG. 2 is a vertical sectional view of the X-ray image detection apparatus in accordance with the second embodiment. The configuration of this example is identical to that of the first embodiment except that the elastic body 9 used in the apparatus of the first embodiment is not provided. Namely, the thickness of the scintillator substrate 1 is set such that the X-ray-transparent substrate 1a comes into contact with the press plate 8, thereby improving the adhesion of the scintillator substrate 1 to the solid-state imaging device 2. Images having a favorable quality can also be obtained in this case as in the case mentioned above. In this apparatus, the shield member 7 also constitutes a positioning portion, whereas the upper face of the positioning portion 4a of the frame 4 is located as high as the upper face of the scintillator substrate 1.

Third Embodiment

Figure 3:
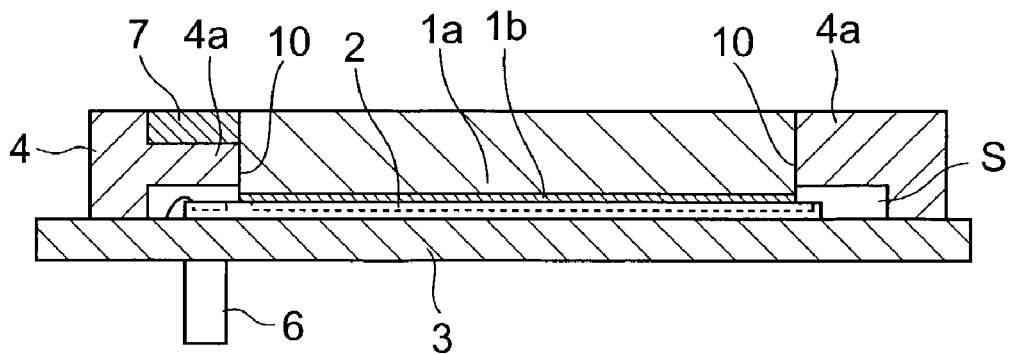
FIG. 3 is a vertical sectional view of the X-ray image detection apparatus in accordance with a third embodiment.

FIG. 3 is a vertical sectional view of the X-ray image detection apparatus in accordance with the third embodiment. This example has a configuration identical to that of the second embodiment except that the press plate 8 in the second embodiment is omitted by using the above-mentioned adhesive 10. Namely, the surface of the X-ray-transparent substrate 1a on the side opposite from the scintillator 1b is exposed. Since the press plate 8 is omitted, the X-ray incidence rate to the scintillator 1b can be improved as compared with that in the second embodiment.

Fourth Embodiment

Figure 4:
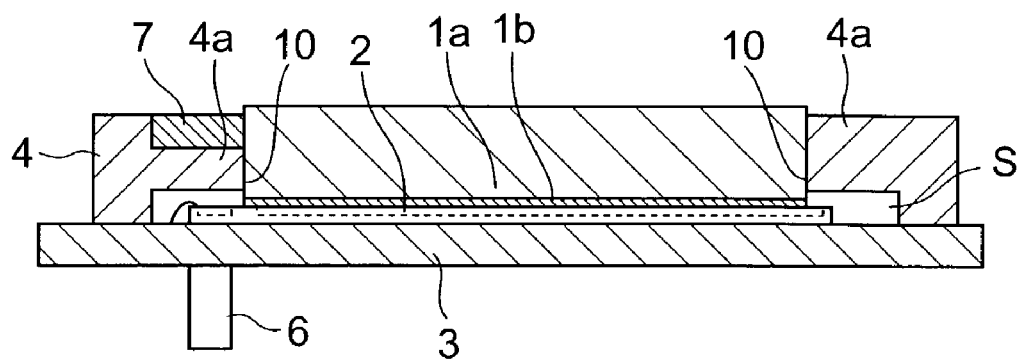
FIG. 4 is a vertical sectional view of the X-ray image detection apparatus in accordance with a fourth embodiment.

FIG. 4 is a vertical sectional view of the X-ray image detection apparatus in accordance with the fourth embodiment. This example has a configuration identical to that of the third embodiment except that the upper face of the scintillator substrate 1 is set higher than the upper face of the positioning portion 4a of the frame 4. Since the substrate 1a proprudes slightly above the positioning portion 4a in this example, the scintillator substrate 1 can be inserted into the opening of the frame 4 while keeping the projecting part during the manufacture.

Fifth Embodiment

Figure 5:
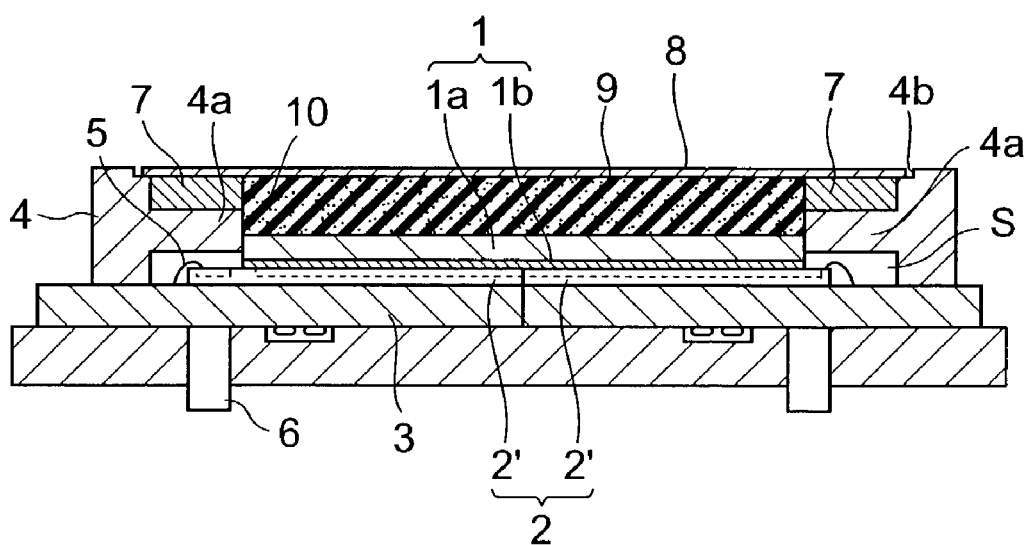
FIG. 5 is a vertical sectional view of the X-ray image detection apparatus in accordance with a fifth embodiment.

FIG. 5 is a vertical sectional view of the X-ray image detection apparatus in accordance with the fifth embodiment. In this apparatus, the solid-state imaging device 2 is not constituted by a single semiconductor solid-state imaging device chip, but a plurality of semiconductor solid-state imaging device chips 2' arranged adjacent each other into a plane. Except for this point, the apparatus has a configuration identical to that of the first embodiment. When carrying out X-ray imaging with a large area, the bubbles may be remarkably formed if the imaging plane is coated with an adhesive as conventionally effected. The apparatus can securely restrain this phenomenon from occurring.

In this example, in particular, a plurality of semiconductor solid-state imaging device chips 2' are pressed toward the mount substrate 3 by a mass of elastic body 9 such that all the imaging planes of the semiconductor solid-state imaging device chips 2' are positioned within the same plane, whereby the effect mentioned above is made remarkable, and the distortion of captured images can be reduced.

The solid-state imaging device 2 constituted by a plurality of semiconductor solid-state imaging device chips 2' can also be employed in the apparatus of the second to fourth embodiments.

Sixth Embodiment

Figure 6:
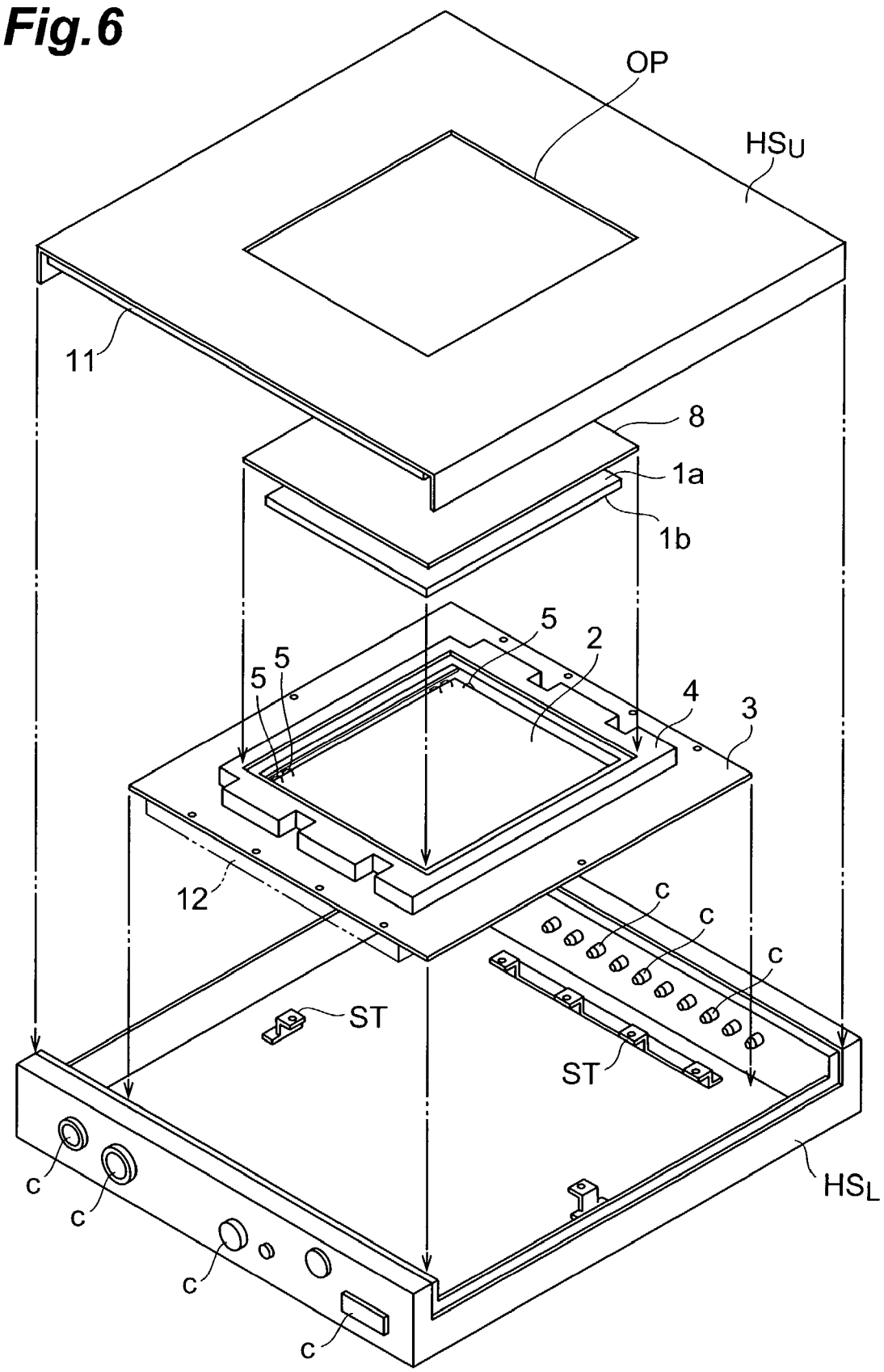
FIG. 6 is a perspective view showing the X-ray image detection apparatus in accordance with a sixth embodiment in an exploded state.

FIG. 6 is a perspective view showing the X-ray image detection apparatus in accordance with a sixth embodiment in an exploded state. In this embodiment, one of the X-ray image detection apparatus in accordance with the first to fifth embodiments is accommodated in a housing. This housing comprises a housing body $HS_L$ and an upper lid $HS_U$ adapted to mate therewith. The upper lid $HS_U$ is formed with an X-ray entrance opening OP. This opening OP is closed with an X-ray-transparent flat sheet 11 attached to the inside of the upper lid $HS_U$, which is preferably made of polycarbonate or amorphous carbon.

Disposed directly under the X-ray entrance opening OP is one of the X-ray image detection apparatus in accordance with the first to fifth embodiments, whereas an electronic circuit unit 12 including driving circuits for driving the solid-state imaging device 2, an amplifier for amplifying video signals from the solid-state imaging device 2, and the like is provided on the back side of the mount substrate 3, whereas the power supply to these driving circuits, and the transmitting/receiving of control signals, video signals, and the like are carried out by way of a plurality of connectors provided in a side face of the housing. Spacers and stays ST are interposed between the mount substrate 3 and the bottom face of the housing, so as to secure a space in which the electronic circuit unit 12 is disposed. Since the devices are accommodated in the housing, this apparatus protects the electronic circuit unit 12 and the like.

What is claimed is:

1. An X-ray image detection apparatus comprising:
   a scintillator substrate having a scintillator formed on an X-ray-transparent substrate;
   a solid-state imaging device having an imaging plane on which said scintillator is disposed;
   a mount substrate, formed with a lead for inputting an output signal from said solid-state imaging device, for securing said solid-state imaging device;
   a frame, secured onto said mount substrate so as to surround said solid-state imaging device, having a positioning portion projecting toward said scintillator substrate such that at least a part thereof abuts against said scintillator substrate; and
   a bonding wire, positioned within a space between said positioning portion and said mount substrate, for connecting said solid-state imaging device and said lead to each other,
   wherein said positioning portion and said scintillator substrate are bonded to each other, and
   wherein said positioning portion surrounds four side faces of said scintillator substrate and abuts against said side faces of said scintillator substrate.

2. An X-ray image detection apparatus according to claim 1, wherein said frame is made of a metal.

3. An X-ray image detection apparatus according to claim 1, wherein said positioning portion of said frame is further provided with a shield member made of an X-ray-shielding material on a side opposite from said bonding wire.

4. An X-ray image detection apparatus according to claim 1, further comprising a press plate secured to said frame so as to close an opening of said frame, and an elastic body interposed between said press plate and said scintillator substrate, said elastic body pressing said scintillator substrate toward said solid-state imaging device.

5. An X-ray image detection apparatus according to claim 1, further comprising a press plate secured to said frame so as to close an opening of said frame, said scintillator substrate having a thickness set such that said X-ray-transparent substrate comes into contact with said press plate.

6. An X-ray image detection apparatus according to claim 1, wherein said X-ray-transparent substrate has an exposed surface on a side opposite from said scintillator.

7. An X-ray image detection apparatus according to claim 1, wherein said scintillator is coated with a resin film.

8. An X-ray image detection apparatus according to claim 7, wherein said X-ray-transparent substrate is made of X-ray-transparent glass or amorphous carbon, said scintillator is made of CsI having a columnar crystal, and said resin film is made of polyparaxylylene.

9. An X-ray image detection apparatus according to claim 1, wherein said solid-state imaging device comprises a plurality of semiconductor solid-state imaging device chips arranged.

10. An X-ray image detection apparatus according to claim 9, wherein said plurality of semiconductor solid-state imaging device chips are pressed toward said mount substrate by a mass of elastic body such that all the imaging planes of said plurality of semiconductor solid-state imaging device chips are positioned within a single plane.

11. An X-ray image detection apparatus according to claim 1, wherein an inside of said positioning portion is rectangular while a periphery of said scintillator substrate is rectangular.

* * * * *